US011932189B2

United States Patent
Morita et al.

(10) Patent No.: US 11,932,189 B2
(45) Date of Patent: Mar. 19, 2024

(54) DRIVER SEAT AIRBAG

(71) Applicant: Autoliv Development AB, Vargarda (SE)

(72) Inventors: Kazuki Morita, Kanagawa (JP); Kazuhiro Abe, Kanagawa (JP)

(73) Assignee: Autoliv Development AB, Vårgårda (SE)

( * ) Notice: Subject to any disclaimer, the term of this patent is extended or adjusted under 35 U.S.C. 154(b) by 70 days.

(21) Appl. No.: 17/310,441

(22) PCT Filed: Jan. 22, 2020

(86) PCT No.: PCT/JP2020/002142
§ 371 (c)(1),
(2) Date: Aug. 3, 2021

(87) PCT Pub. No.: WO2020/162182
PCT Pub. Date: Aug. 13, 2020

(65) Prior Publication Data
US 2022/0089114 A1 Mar. 24, 2022

(30) Foreign Application Priority Data
Feb. 7, 2019 (JP) .................................. 2019-021106

(51) Int. Cl.
*B60R 21/203* (2006.01)
*B60R 21/2338* (2011.01)
(Continued)

(52) U.S. Cl.
CPC ........ *B60R 21/203* (2013.01); *B60R 21/2338* (2013.01); *B60R 21/239* (2013.01); *B60R 21/26* (2013.01); *B60R 2021/23382* (2013.01)

(58) Field of Classification Search
CPC . B60R 21/203; B60R 21/2338; B60R 21/239; B60R 21/26; B60R 2021/23382; B60R 21/231; B60R 21/2346; B62D 1/06
See application file for complete search history.

(56) References Cited

U.S. PATENT DOCUMENTS 3,618,979 A * 11/1971 Gulette ................. B60R 21/231
280/743.1
5,931,498 A * 8/1999 Keshavaraj ........... B60R 21/237
280/743.1
(Continued)

FOREIGN PATENT DOCUMENTS

JP 11-342819 A 12/1999
JP 2001-219801 A 8/2001
(Continued)

*Primary Examiner* — Paul N Dickson
*Assistant Examiner* — Matthew Joseph Ganci
(74) *Attorney, Agent, or Firm* — Matthew D. Thayne; Thayne and Davis LLC

(57) ABSTRACT

An airbag for a driver seat is provided with: a steering wheel of a vehicle; an inflator stored in the steering wheel; and a cushion stored in the steering wheel along with the inflator that expands and deploys to restrain a passenger. The cushion contains: a steering side panel positioned on a steering wheel side; an occupant side panel positioned on an occupant side; and a side panel connecting an edge of the steering side panel to an edge of the occupant side panel to configure a side portion of the cushion. The occupant side panel has a larger area than the steering side panel, and an upper portion of the expanded and deployed cushion is thicker in the vehicle front-rear direction than a lower portion of the cushion.

22 Claims, 12 Drawing Sheets

(51) Int. Cl.
*B60R 21/239* (2006.01)
*B60R 21/26* (2011.01)

(56) References Cited

U.S. PATENT DOCUMENTS

| | | | | |
|---|---|---|---|---|
| 2012/0292896 A1* | 11/2012 | Higuchi | ............... | B60R 21/239 |
| | | | | 280/743.1 |
| 2013/0285356 A1* | 10/2013 | Fischer | ............... | B60R 21/235 |
| | | | | 280/743.1 |
| 2015/0239422 A1* | 8/2015 | Ishiguro | ............... | B60R 21/239 |
| | | | | 280/731 |
| 2016/0221524 A1* | 8/2016 | Sekino | ............... | B60R 21/2338 |
| 2017/0355341 A1* | 12/2017 | Keyser | ............... | B60R 21/203 |
| 2018/0281731 A1* | 10/2018 | Hotta | ............... | B60R 21/2338 |
| 2018/0361980 A1* | 12/2018 | Schneider | ............ | B60R 21/231 |
| 2019/0001915 A1* | 1/2019 | Hotta | ............... | B60R 21/2338 |

FOREIGN PATENT DOCUMENTS

| | | | |
|---|---|---|---|
| JP | 2005-271736 A | | 10/2005 |
| JP | 3991739 B2 | | 10/2007 |
| JP | 2008-49834 A | | 3/2008 |
| JP | 2008-94341 A | | 4/2008 |
| JP | 2013-529577 A | | 7/2013 |
| JP | 2018-20737 A | | 2/2018 |

* cited by examiner (a)

(b)

(a)

(b)

(c)

(a)

(b)

(a)

(b)

[FIG. 12]
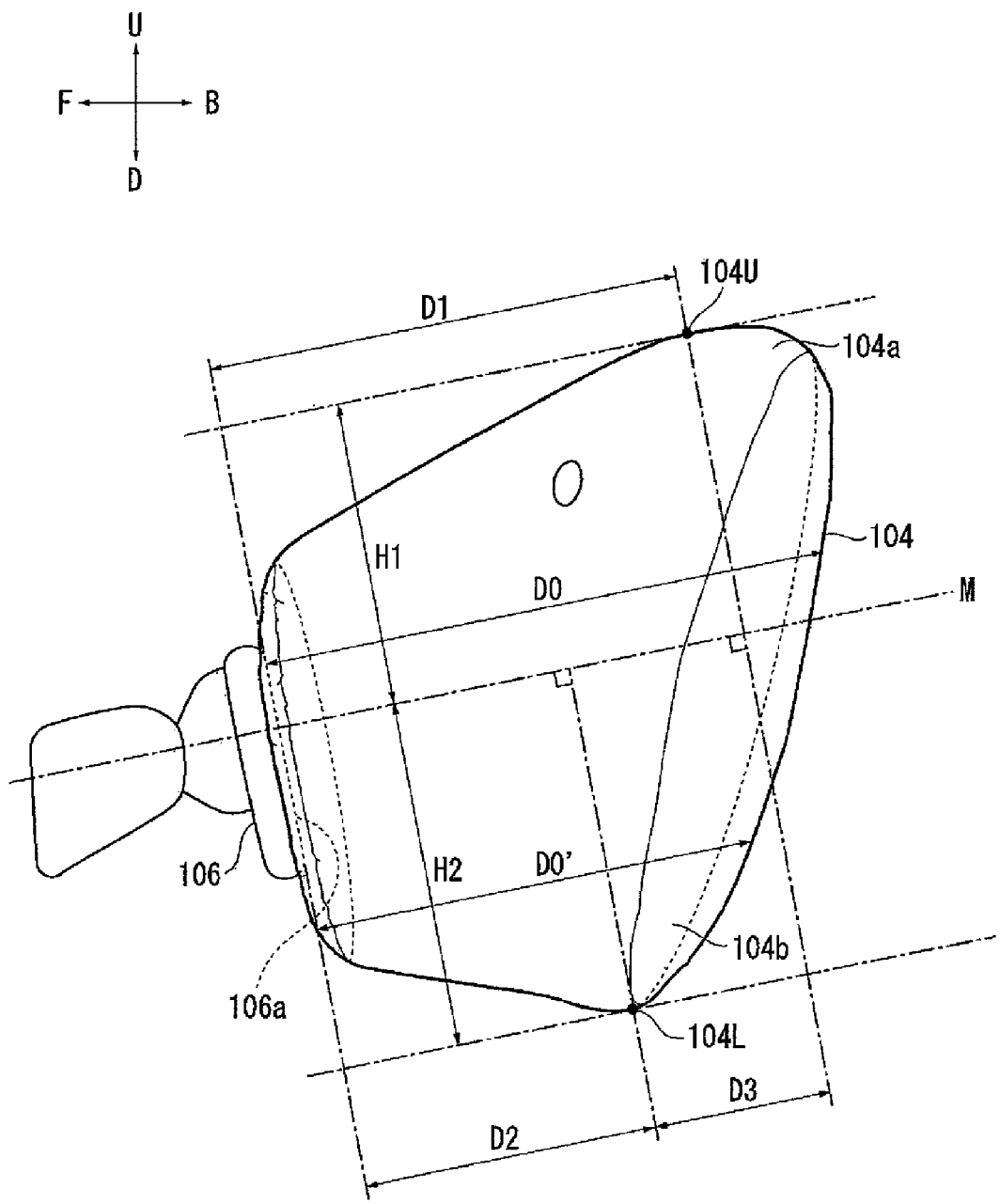

DRIVER SEAT AIRBAG

TECHNICAL FIELD

The present invention is related to an airbag for a driver seat for restraining an occupant in the event of an accident.

BACKGROUND TECHNOLOGY

Currently, essentially all vehicle steering wheels are equipped with an airbag for a driver seat. An airbag cushion of the airbag for a driver seat is primarily stored in a central hub of the steering wheel and expands and deploys in a circular shape as viewed by an occupant (for example, Patent Document 1). Normally, a steering wheel is in a position in which an upper side is inclined toward a front of a vehicle. An airbag 1 of Patent Document 1 is configured such that a front surface 1f (occupant restraining surface) is vertical even when expanded and deployed from an inclined steering wheel by increasing the thickness of an upper portion in a vehicle front-rear direction.

PRIOR ART DOCUMENTS

Patent Documents

Patent Document 1: Japanese Patent Publication 3991739

SUMMARY OF THE INVENTION

In recent years, new steering wheels that transmit a steering force to a wheel via an electrical signal are being developed, and steering wheel designs are becoming more diverse. In particular, a new electrically connected steering wheel does not need to be significantly rotated, unlike a conventional steering wheel, which physically transmits a steering force via a steering shaft. Specifically, a grip of new steering wheels does not need to be a circular ring because the grip does not need to be rotated more than 180° while being held by the left and right hands like a conventional rim. Therefore, new steering wheel can adopt a variant design other than a circular ring, such as grips present on only left and right sides with regard to a central hub (hereinafter, a steering wheel with a grip other than a circular ring is referred to as a "variant steering wheel").

In the airbag 1 disclosed in the cited document 1 described above, a rear panel 7 is larger than a front panel 8 in order to secure the thickness of an upper portion. If a steering wheel 4 has a conventional circular ring rim, the large diameter rear panel 7 is preferably in contact with the steering wheel 4, and the airbag 1 can fully restrain the occupant while achieving a reaction force from the steering wheel 4. However, the variant steering wheel generally has a smaller size and a more biased shape than a conventional steering wheel, and reduces contact range with the airbag cushion. When applied to this steering wheel with a narrow contact range, the airbag 1 with the large diameter rear panel 7 of cited document 1 has a lot of waste in shape, and there is room for improvement.

Problem to be Solved by the Invention

In view of the foregoing, an object of the present invention is to provide an airbag for a driver seat capable of fully restraining an occupant even when applied to a steering wheel having a narrow contact range.

Means for Solving the Problems

In order to solve the aforementioned problem, a typical configuration of an airbag for a driver seat according to the present invention is an airbag for a driver seat, containing: a steering wheel of a vehicle; an inflator stored in the steering wheel; and an airbag cushion stored in the steering wheel along with the inflator and that expands and deploys to restrain an occupant; wherein the airbag cushion contains a steering side panel positioned on a steering wheel side, an occupant side panel located on an occupant side, and a side panel connecting an edge of the steering side panel to an edge of the occupant side panel to configure a side portion of the airbag cushion, the occupant side panel having a larger area than the steering side panel, and an upper portion of the expanded and deployed airbag cushion being thicker in a front/rear direction of the vehicle than a lower portion of the airbag cushion.

The airbag cushion with the aforementioned configuration has a shape where an upper portion in the vehicle front-rear direction is thick and a lower portion has a reduced thickness. Therefore, the upper portion of the airbag cushion can fully restrain the head of an occupant based on the thickness thereof, while the lower portion can easily enter a narrow space between the steering wheel and an abdomen of the occupant. In particular, the lower portion of the airbag cushion is sandwiched between the steering wheel and the abdomen. Therefore, the shape of the airbag cushion is less likely to collapse, and the head restraining performance by the upper portion can also be improved. In particular, the airbag cushion can start deploying at an early stage in an occupant abdomen direction and can start initially restraining the occupant from the abdomen.

In the airbag cushion with the aforementioned configuration, the occupant side panel, which is an occupant restraining surface, is wide, and the steering side panel, which receives a reaction force from the steering wheel, is narrow. As described above, the lower portion of the airbag cushion is sandwiched between the steering wheel and the abdomen, such that the shape is stabilized. Therefore, the airbag cushion can make the area of the steering side panel narrow without reducing the occupant restraining force. In accordance therewith, it is possible to contribute to cost reduction by omitting a portion of the steering side panel that does not contact the steering wheel, reducing the amount of material used, reducing the gas capacity of the airbag cushion can be reduced, and the like. Reducing the gas capacity shortens the time required for the expansion of the airbag cushion to be completed, which leads to the improvement of the occupant restraining performance.

The steering wheel described above contains a central hub that stores the inflator and airbag cushion, and a grip that rotates around the hub, and the grip may be a variant other than a circular ring.

Many of the new steering wheels that have been developed in recent years do not have a circular ring rim as conventional, and there are a variety of designs, such as providing grips only on left and right sides of the hub and the like. These variant steering wheels with a non-circular ring grip have a narrower contact range with the airbag cushion than conventional steering wheels with a circular ring rim. The airbag cushion of the aforementioned configuration can be suitably applied to this variant steering wheel. In particular, when using a steering side panel with a small area, the airbag cushion can be folded or the like into a smaller storing form, and can be easily installed on a variant steering wheel with limited storing space.

In the expanded and deployed airbag cushion described above, a center of the occupant side panel may be positioned above a center of the steering side panel. By arranging the occupant side panel at an upper side with regard to the steering side panel, an upper body of the occupant is easily restrained.

The side panel described above may have an arcuate strip shape in a state spread out on a plane. Furthermore, a center in a longitudinal direction of the arcuate strip shaped side panel may be positioned on the upper portion of the expanded and deployed airbag cushion, and two ends in the longitudinal direction may be positioned at the lower portion of the airbag cushion. Moreover, the center in the longitudinal direction of the arcuate strip shaped side panel may be wider than the two ends in the longitudinal direction. According to this configuration, an airbag cushion in which the width of the upper portion is thicker than that of the lower portion in the vehicle front-rear direction can be suitably achieved.

The two ends in the longitudinal direction of the arcuate strip shaped side panel described above may be connected to each other at the lower portion of the expanded and deployed airbag cushion, and the width of the center in the longitudinal direction of the arcuate strip shaped side panel may be 1.1 to 2.7 times greater than the width of the two ends in the longitudinal direction. Even with this configuration, an airbag cushion in which the width of the upper portion is thicker than that of the lower portion in the vehicle front-rear direction can be suitably achieved.

The side panels described above may be provided between an entire circumference of the edge of the steering side panel and an entire circumference of the edge of the passenger side panel. Thus, it is beneficial to use a configuration in which the steering side panel and the occupant side panel are not directly stitched together, which facilitates stitching in forming the airbag cushion into a bag shape.

The side panels described above may be continuous with at least a portion of the edge of the steering side panel or at least a portion of the edge of the passenger side panel. Thus, the airbag cushion can be suitably formed even in a configuration where the side panel and the steering side panel or the occupant side panel are integrated.

A boundary between the side panel and the occupant side panel may extend upward, or extend at an angle that moves toward the back of the vehicle while moving upward, when the expanded and deployed airbag cushion is viewed from a vehicle width direction. According to this configuration, the shape of the airbag cushion can be made such that the upper portion can easily receive the head of the occupant and the lower portion can easily enter between the steering wheel and the abdomen of the occupant.

The steering side panel described above may be circular, the circular steering side panel may be a secured region secured to the steering wheel, and the secured region may be provided in a center of the circular steering side panel or on an upper side of the center of the circular steering side panel. When a secured region is present in the center or on an upper side, an overall position of the steering side panel and cushion can be lowered, thereby allowing the lower portion of the cushion to easily enter between the steering wheel and the abdomen.

An upper end of the occupant side panel of the expanded and deployed airbag cushion described above may be positioned at a height in a range of ±100 mm of the center of gravity of the head of an adult male. When the occupant side panel comes into contact with the head from a site positioned at an upper or lower end of the head, such as the chin, forehead, or the like, a rotational movement such as forward bending, backward bending, or the like of the head may occur. The forward and backward bending of the head are likely to cause high injury values due to the structure of the human body. In the configuration described above, the occupant side panel can be in contact from a position of the center of gravity of the head (in the vicinity of the nose) to reduce the injury value.

The airbag cushion described above may have a first vent hole that is opened in the side panel to discharge gas. The first vent hole provided in the side panel allows the gas to be discharged in a direction in which an occupant is not present.

The airbag cushion described above may have a second vent hole in a condition where a portion of a boundary between the side panel and the steering side panel is opened and discharges gas. The second vent hole can also discharge the gas in a direction where an occupant is not present.

The airbag cushion may have a third vent hole that is opened in the steering side panel to discharge gas. The third vent hole can also discharge the gas in a direction where an occupant is not present.

The airbag cushion described above may further contain one or more tethers that are provided between the occupant side panel and the steering side panel, and the tether may have a dimension that tensions when the airbag cushion expands and deploys to pull the occupant side panel toward the steering side panel. The tether allows the shape of the occupant side panel to change to improve the occupant restraining performance and reduce the injury value.

The airbag cushion described above may further have a center panel of a predetermined area connected by circular stitching to an inner side of the occupant side panel, a plurality of the tethers may be provided, and the plurality of tethers may extend from a plurality of locations on the center panel towards the steering side panel. According to this configuration, the shape of the occupant side panel can be controlled to expand to a target shape.

The plurality of tethers described above may extend from symmetrical points on the center panel. Based on this configuration, the shape of the occupant side panel is easily controlled.

The center panel described above may be connected to a biased position on a lower side of the occupant side panel. By reducing the expansion of the lower portion of the occupant side panel, the lower portion of the occupant side panel can easily enter between the steering wheel and the abdomen of the occupant.

The tether described above is connected to a lower side of the center of the occupant side panel. By reducing the expansion of the lower portion of the occupant side panel, the lower portion of the occupant side panel can easily enter between the steering wheel and the abdomen of the occupant.

The tether described above is connected to an upper side of the center of the occupant side panel. By reducing the expansion of the upper side of the occupant side panel, the injury value to the head of the occupant can be reduced.

A portion of the inflator may be inserted into the airbag cushion through the steering side panel, and a predetermined gas discharging port may be formed in that portion; the airbag cushion may further have a flow-regulating material connected to the steering side panel and covering a portion of the inflator, and the flow-regulating material may contain an opening part below a portion of the inflator.

The flow-regulating material described above allows gas supplied from the inflator to flow downward through the opening part, and thus the airbag cushion can expand from a lower portion side. Therefore, the airbag cushion can start to deploy at an early stage in a direction of the abdomen of the occupant, quickly enter between the steering wheel and the abdomen of the occupant, and start initially restraining from the abdomen.

The airbag cushion described above may have a gas capacity in a range of 50 liters to 60 liters. A gas capacity in this range would not require a high power inflator, and thus a small and inexpensive inflator can be used.

The inflator described above may have an output in a range of 200 kPa to 230 kPa. An inflator with this output is small and inexpensive, which is beneficial from the perspective of weight reduction and cost reduction.

Effect of the Invention

The present invention can provide an airbag for a driver seat capable of fully restraining an occupant even when applied to a steering wheel having a narrow contact range.

BRIEF DESCRIPTION OF THE DRAWINGS

FIG. 12 is a diagram illustrating an outline of the cushion of FIG. 4.

DESCRIPTION OF CODES

Figure 1:
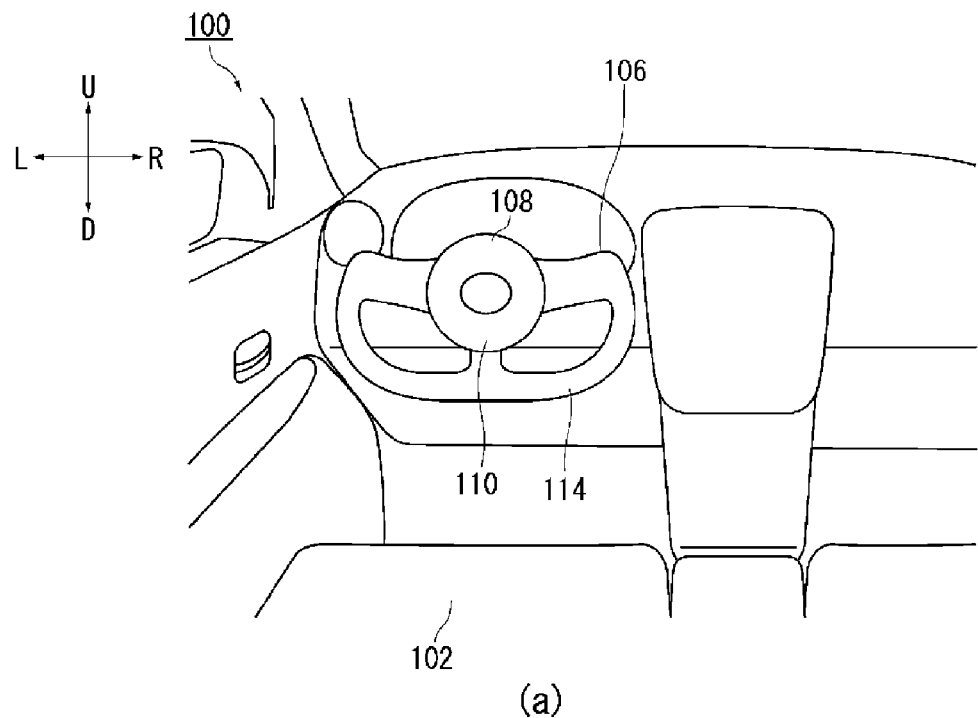
FIG. 1 is a diagram illustrating an outline of an airbag for a driver seat according to an embodiment of the present invention.
Figure 1:
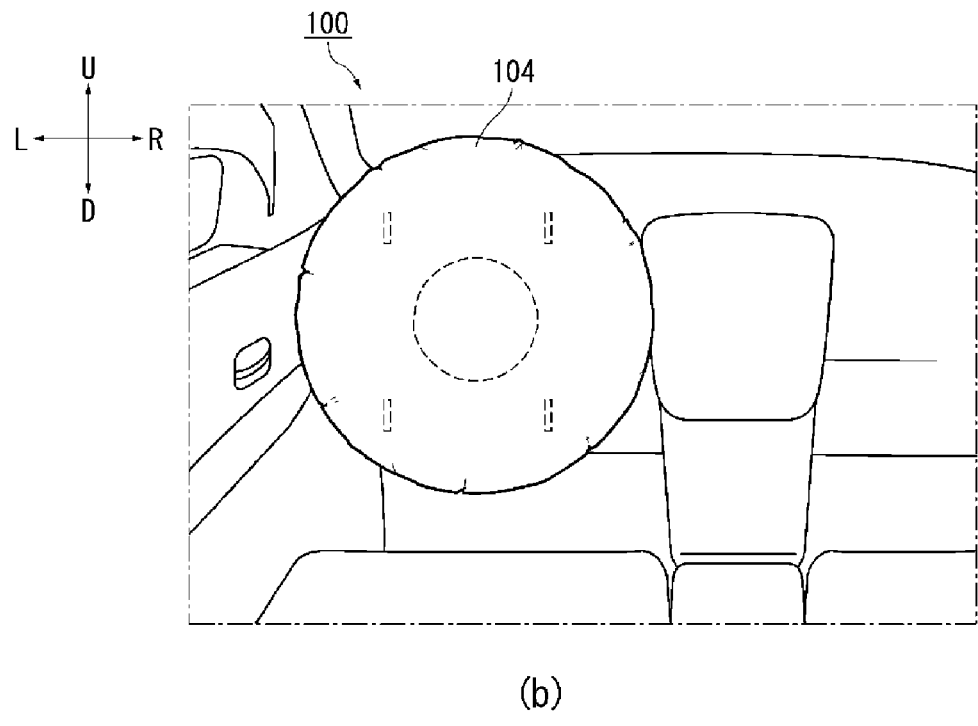

100 . . . Airbag for a driver seat, 102 . . . Seat, 104 . . . Cushion, 104a . . . Upper portion of cushion, 104b . . . Lower portion of cushion, 104L . . . Lower end portion of cushion, 104U . . . Upper end portion of cushion, 106 . . . Variant steering wheel, 106a . . . Surface of steering wheel, 108 . . . Hub, 110 . . . Cover, 112 . . . Inflator, 116 . . . Gas discharging port, 118 . . . Stud bolt, 120 . . . Occupant side panel, 120a . . . Upper end of occupant side panel, 122 . . . Steering side panel, 124 . . . Side panel, 126a, 126b . . . First vent hole, 128 . . . Secured region, 130 . . . Large diameter side arc, 132 . . . Small diameter side arc, 134 . . . center of side panel, 136a, 136b . . . Two ends of side panel, 138 . . . Occupant, 140 . . . Head, 142 . . . Abdomen, 144 . . . Internal tether, 146a, 146b . . . Auxiliary tether, 148 . . . Center panel, 150a, 150b . . . Tether, 152a, 152b . . . End portion of auxiliary tether, 154 . . . Bent portion, 200 . . . Cushion of modified example, 200a . . . Upper portion of cushion, 202 . . . Side panel, 220 . . . Steering side panel, 222 . . . Secured region, 240 . . . First integrated panel, 242 . . . Side panel, 244 . . . Steering side panel, 260 . . . Second integrated panel, 262 . . . Side panel, 264 . . . Occupant side panel, 280a, 280b . . . Second vent hole, 282 . . . Boundary of side panel and steering side panel, 300a, 300b . . . Third vent hole, 320 . . . Tether of first modified example, 340 . . . Tether of second modified example, 360 . . . Flow-regulating material, 364 . . . Opening portion, 366a, 366b . . . Exhaust port, 368 . . . Inserting port, D0 . . . Thickness of center of cushion, D1 . . . Thickness of upper portion of cushion, D2 . . . Thickness of lower portion of cushion, H1 . . . Up-down dimension of upper side of cushion, H2 . . . Up-down dimension of lower side of cushion, L1 . . . Virtual line extending from center of steering side panel, L2 . . . Boundary between side panel and occupant side panel, L3 . . . Boundary between side panel and occupant side panel, M . . . Rotational axis of steering wheel, P1 . . . Center of occupant side panel, P2 . . . Center of steering side panel in height direction, P3 . . . Center of gravity of head, S1 . . . Stitching between occupant side panel and internal tether, W1 . . . Width of upper portion of cushion, W2 . . . Width of lower portion of cushion, W3 . . . Width of center of side panel in longitudinal direction, W4 . . . Width of two ends of side panel

MODE FOR CARRYING OUT THE INVENTION

Preferred embodiments according to the present invention will hereinafter be described in detail with reference to the attached drawings. Dimensions, materials, other specific numerical values, and the like indicated in the embodiments are merely examples for ease of understanding of the invention and do not limit the present invention unless otherwise noted. Note that in the present specification and drawings, elements having essentially identical functions and configurations are labeled with identical symbols in order to omit redundant descriptions along with an illustration of elements not directly related to the present invention.

FIG. 1 is a diagram illustrating an outline of an airbag 100 for a driver seat according to an embodiment of the present invention. FIG. 1(a) is a view illustrating a vehicle prior to an operation of the airbag 100 for a driver seat. Hereinafter, regarding FIG. 1 and other diagrams, a vehicle front-rear direction are illustrated by the symbols F (Front) and B (Back), a vehicle width direction of the vehicle by the symbols L (Left) and R (Right), and a vehicle up-down direction by the symbols U (Up) and D (Down).

The airbag 100 for a driver seat is applied in the present embodiment as an airbag for airbag for a driver seat for a vehicle with a steering wheel on a left side (front row left side seat 102). Hereinafter, explanations are made assuming the front row left side seat 102, for example, a vehicle outer side in the vehicle width direction (hereinafter, outer vehicle side) refers to a left side of the vehicle, and a vehicle inner side in the vehicle width direction (hereinafter, vehicle inner side) refers to a right side of the vehicle. Furthermore, with regard to the present embodiment, a front direction is described as "front" and a back side direction is described as "rear" as viewed from an occupant normally seated in the seat 102. Similarly, a right hand direction of a normally seated occupant is described as "right" and a left hand direction is described as "left". Furthermore, with regard to the center of the occupant's body at this time, a direction toward the head is "up" and a direction toward the legs is "down".

An airbag cushion of an airbag for a driver seat (hereinafter referred to as cushion 104 (see FIG. 1(b)) is stored in a condition folded, wound, or the like inside a central hub 108 of the steering wheel (variant steering wheel 106 described later) in front of a seating position of the seat 102. The hub 108 contains: a housing (omitted in the drawings) that stores the cushion 104; a cover 110; and the like. The inflator 112 (see FIG. 2(a)) is also stored inside the hub 108 along with the cushion 104.

The variant steering wheel 106 on which the cushion 104 is installed in the present embodiment is assumed to be of a configuration in which an operation of the occupant is converted into an electrical signal and transmitted to the wheel. The variant steering wheel 106 has a grip 114 of a shape other than a circular ring, and has a different shape from a conventional steering wheel with a circular rim. The grip 114 accepts an operation of rotating about the central hub 108, but unlike a conventional circular ring rim, an operation of rotating the grip at a large angle is not necessary, and therefore, there is no need to hold the grip with the left or right hand. Therefore, the grip 114 is shaped to be present only on left, right and lower sides of the hub 108, and no structure is present on an upper side of the hub 108.

FIG. 1(b) is a diagram illustrating a vehicle after the cushion 104 of the airbag for a driver seat expands and deploys. The cushion 104 begins to expand while the cover 110 is cleaved open by gas from the inflator 112 (see FIG. 2(a)), and expands and deploys into a bag shape in front of the seating position of the seat 102 to restrain the upper body and head of the occupant from moving forward. The cushion 104 has a circular shape as viewed from the seating position side, and is formed by overlaying a plurality of panels that form the surface thereof and then stitching or adhering.

Figure 2:
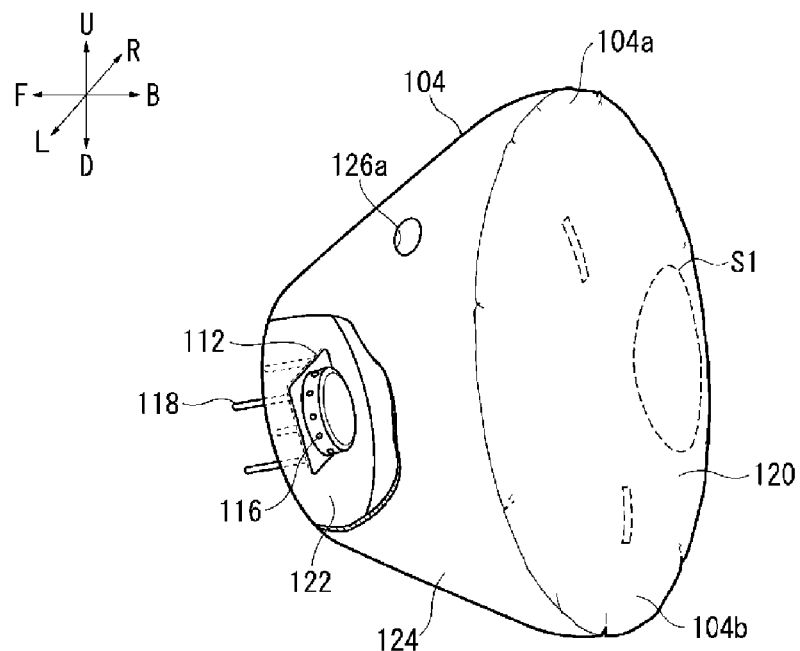
FIG. 2 is a diagram illustrating a cushion in FIG. 1(b) from each direction during expansion and deployment.
Figure 2:
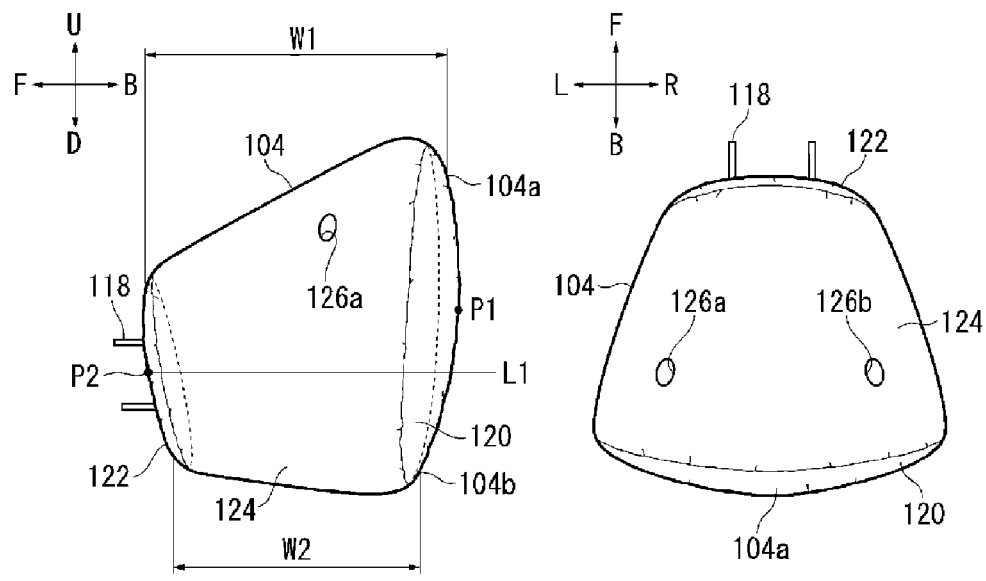

FIG. 2 is a diagram illustrating a cushion 104 in FIG. 1(b) from each direction during expansion and deployment. FIG. 2(a) illustrates the cushion 104 in FIG. 1(b) seen from slightly above the vehicle outer side. In FIG. 2(a), a portion of the panel configuring the cushion 104 is cut out to expose the internal inflator 112.

The cushion 104 in the present embodiment has, as a characteristic shape, a shape similar to a truncated cone with the diameter widening from the variant steering wheel 106 side (see FIG. 1(a)) toward the occupant side (vehicle rear side).

The inflator 112 is a device for supplying gas, and in the present embodiment, a disk type is used. The inflator 112, where a portion thereof formed with a gas outlet 116 is inserted into the cushion 104 through the steering side panel 122, is activated based on an impact detection signal transmitted from a sensor not illustrated in the drawings to supply gas to the cushion 104. The inflator 112 is provided with a plurality of stud bolts 118. The stud bolts 118 pass through the steering side panel 122 of the cushion 104 in order to fasten to an interior of the hub 108 of the variant steering wheel 106 (see FIG. 1(a)) described above. The cushion 104 is also secured to the interior of the hub 108 by the fastening the stud bolts 118.

Note that examples of currently prevailing inflators include: types filled with a gas generating agent and that burns the agent to generate a gas; types filled with a compressed gas and supplies the gas without generating heat; hybrid types that utilize both a combustion gas and a compressed gas; and the like. Any of these types of inflators can be used as the inflator 112.

FIG. 2(b) is a diagram illustrating the cushion 104 of FIG. 2(a) from a left side in the vehicle width direction. The cushion 104 is formed from a plurality of panels and contains: an occupant side panel 120 (positioned in front as viewed from the occupant, and thus is also referred to as a front panel) positioned on the occupant side; a steering side panel 122 (positioned behind as viewed from the occupant, and thus is also referred to as a rear panel) positioned on the variant steering wheel 106 side (see FIG. 1(a)); and a side panel 124 connecting the occupant side panel 120 and the steering side panel 122 to configure a side portion of the cushion 104. In FIG. 2(b), back side edges of the occupant side panel 120 and the steering side panel 122 are illustrated by dashed lines, respectively.

The expanded and deployed cushion 104 is shaped along a truncated cone, but is generally slightly inclined. Specifically, the shape is inclined such that a center P1 of the occupant side panel 120 in a height direction is positioned above an imaginary line L1 horizontally extended from a center P2 of the steering side panel 122 in the height direction. Furthermore, when the cushion 104 is expanded and deployed, the occupant side panel 120 is disposed so as to extend essentially vertically, while the steering side panel 122 is disposed in an inclined manner such that an upper part leans to a vehicle front side (left side in FIG. 2(b)). As a result, in the vehicle front-rear direction, the width W1 of an upper portion 104a of the expanded and deployed airbag cushion 104 is thicker than the width W2 of a lower portion 104b of the airbag cushion 104.

FIG. 2(c) is a diagram illustrating the cushion 104 of FIG. 2(a) from above. The cushion 104 is in the shape of an essentially symmetrical truncated cone when viewed from above. Two first vent holes 126a, 126b that discharge gas are open in the side panel 124. Vent holes 126a, 126b are provided on an upper side of the side panel 124 at two locations on left and right sides. The vent holes 126a, 126b in these positions allow gas to be vented in a direction where the occupant is not present during expansion and deployment of the cushion 104.

Figure 3:
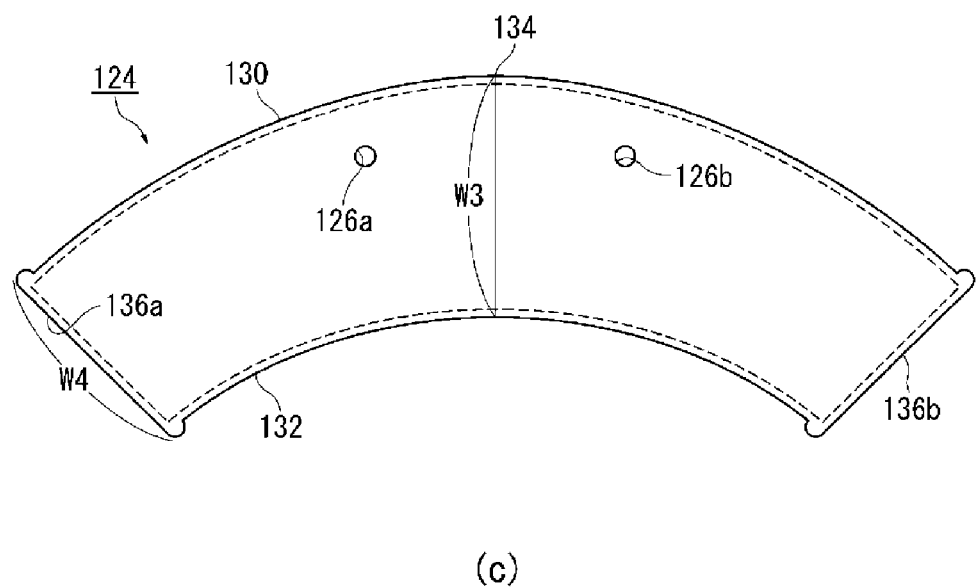
FIG. 3 is a diagram illustrating each panel configuring a cushion in FIG. 2(b).

FIG. 3 is a diagram illustrating each panel configuring a cushion 104 in FIG. 2(b). In FIG. 3, each panel is illustrated in a state spread out on a plane. FIG. 3(a) is a diagram illustrating the occupant side panel 120 of FIG. 2(b). The occupant side panel 120 is circular and functions as an occupant restraining surface that restrains the occupant during expansion and deployment of the cushion 104. A stitching S1 with an internal tether 144 (see FIG. 5(a)) described later is present at a center and four corners of the occupant side panel 120.

FIG. 3(b) is a diagram illustrating the steering side panel 122 in FIG. 2(b). The steering side panel 122 is circular and serves as a reaction surface that obtains a reaction force from the variant steering wheel 106 (see FIG. 1(a)) when the cushion 104 (see FIG. 1(b)) is expanded and deployed. The cushion 104 expands and develops in a shape of a truncated cone spreading toward the occupant side, and therefore, the steering side panel 122 has a narrower area than the occupant side panel 120 (see FIG. 3(a)). A secured region 128, in which the inflator 112 (see FIG. 2(a)) is inserted and secured inside the hub 108, is formed in the center of the steering side panel 122.

FIG. 3(c) is a diagram illustrating the side panel 124 of FIG. 2(b). The side panel 124 has an arcuate strip shape in a state spread out on a plane. Of two arcs 130, 132, a larger diameter side arc 130 is joined by stitching to the edge of the occupant side panel 120 and a smaller diameter side arc 132 is joined by stitching to the edge of the steering side panel 122.

The two arcs 130, 132 of the side panel 124 are joined to the entire circumference of the edge of the steering side panel 122 and the entire circumference of the edge of the passenger side panel 120. In other words, in the cushion 104 of the present embodiment, the side panel 124 is entirely interposed between the occupant side panel 120 and the steering side panel 122, and a point does not exist where the steering side panel 122 and the occupant side panel 120 are directly stitched together. Furthermore, a location is not present in the cushion 104 where a total of three panels overlap and are simultaneously stitched together. These configurations enable efficient stitching and manufacturing of the cushion 104 into a bag shape.

When forming the cushion 104 (see FIG. 2(*a*)), the arcuate strip shaped side panel 124 is disposed such that a center 134 thereof in the longitudinal direction is positioned on an upper portion of the expanded and deployed cushion 104, and two ends 136*a*, 136*b* in the longitudinal direction are positioned at a lower portion of the cushion 104. In particular, the two ends 136*a*, 136*b* are mutually connected at the lower portion of the expanded and deployed cushion 104.

The two arcs 130, 132 of the side panel 124 have different curvatures, with the large diameter side arc 130 having a slightly greater curvature than the small diameter side arc 132. As a result, the width W3 of the center 134 of the side panel 124 in the longitudinal direction is wider than the width W4 of the two ends 136*a*, 136*b* in the longitudinal direction. As an example, the width W3 of the center 134 in the longitudinal direction can be set from 1.1 times to 2.7 times as wide as the width W4 of the ends 136*a*, 136*b*. This configuration allows the width of the upper portion 104*a* in the vehicle front-rear direction of the cushion 104 in the vehicle front-rear direction to be formed to be thicker than the width of the lower portion, as illustrated in FIG. 2(*b*).

Figure 4:
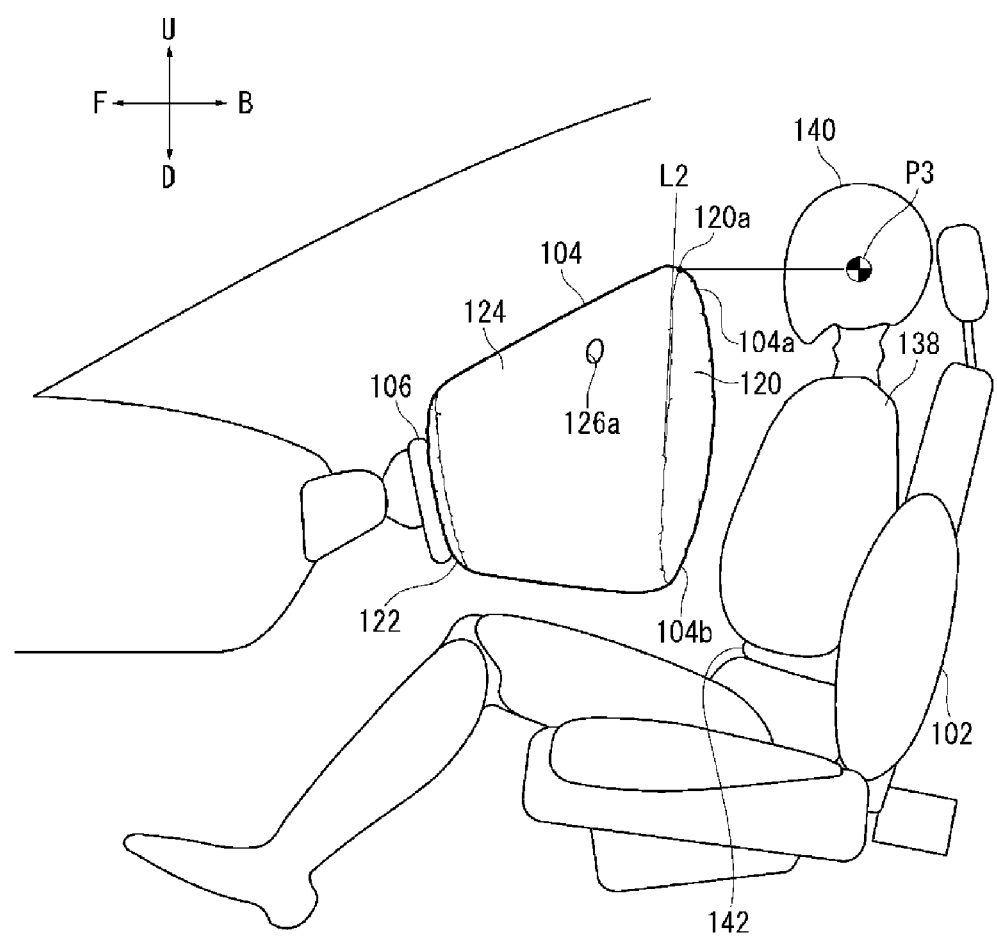
FIG. 4 is a diagram illustrating the cushion in FIG. 2(b) and an occupant seated in a seat.

FIG. 4 is a diagram illustrating the cushion 104 in FIG. 2(*b*) and an occupant 138 seated in a seat 102. FIG. 4 illustrates the cushion 104 and the occupant 138 as viewed from the left side in the vehicle width direction.

In the present example, as described with reference to FIG. 2(*b*), the upper portion 104*a* of the expanded and deployed cushion 104 is configured to be thicker in the vehicle front-rear direction than the lower portion 104*b* of the cushion 104. In particular, the expanded and deployed cushion 104 is installed in this shape such that a boundary L2 between the side panel 124 and the occupant side panel 120 extends upward when viewed from the vehicle width direction. In an emergency, the occupant 138 attempting to move forward in the vehicle will make contact at an early stage from the upper portion 104*a* of the cushion 104. The upper portion 104*a* of the cushion 104 absorbs a load from the head 140 of the occupant 138 with a thickness thereof.

As described with reference to FIG. 2(*b*), the width W2 in the vehicle front-rear direction of the lower portion 104*b* of the cushion 104 is slightly smaller than the width W1 of the upper portion 104*a*. In a general vehicle, the steering wheel is inclined at an angle of approximately 20° to 25° to the vehicle front side, and a space between the steering wheel and the occupant 138 narrows in the vehicle front-rear direction toward a lower abdomen 142 side. With the cushion 104 of the present example, the width in the vehicle front-rear direction decreases as the cushion moves toward the lower portion 104*b*, and therefore, the lower portion 104*b* easily enters the narrow space between the variant steering wheel 106 and the abdomen 142.

According to the configuration described above, the lower portion 104*b* of the cushion 104 is sandwiched by the variant steering wheel 106 and the abdomen 142, and thus the shape of the cushion 104 is less likely to collapse. Furthermore, the restraining performance of the upper portion 104*a* of the cushion 104 with regard to the head 140 of the occupant 138 is also improved as a result. In particular, the stabilized shape of the cushion 104 can prevent movement of the head 140 of the occupant 138, such as forward bending, backward bending, or the like of the head 140, which is prone to high injury values.

With reference to FIG. 12, the shape of the cushion 104 will be described in detail. FIG. 12 is a diagram illustrating an outline of the cushion 104 of FIG. 4. As illustrated in FIG. 12, the expanded and deployed cushion 104 in a state before restraining the occupant has the thickness D2 in front and behind the lower portion 104*b* that is less than the thickness D1 of the upper portion 104*a*. The thickness D1 and thickness D2 can be defined as the thickness of an upper end portion (uppermost portion) 104U and the thickness of a lower end portion (lowermost portion) 104L of the cushion 104 in a direction parallel to a rotational axis M of the steering wheel 106, measured from an occupant side surface 106*a* of the rim of the steering wheel 106. At this time, the upper end portion 104U and the lower end portion 104L of the cushion 104 are furthest points above and below the rotational axis M in a direction orthogonal to the rotational axis M of the steering wheel 106.

The expanded and deployed cushion 104 is configured such that the vertical dimension H2 of a portion on a lower side of the rotational axis M of the steering wheel 106 is longer than the vertical dimension H1 of a portion on an upper side of the rotational axis M. At this time, the dimensions H1, H2 can be defined as the length in a direction orthogonal to the rotational axis M of the steering wheel 106 and parallel to the surface 106*a* of the rim of the steering wheel 106 when the expanded and deployed cushion 104 is viewed from a side.

The thickness D0 of the expanded and deployed cushion 104 in the state before restraining the occupant is the thickness measured from the occupant side surface 106*a* of the rim of the steering wheel 106 to a rear end (occupant side end portion) of the occupant side panel 120 between the upper end portion 104U and the lower end portion 104L. The cushion 104 is set such that D0>D1>D2 more on an upper side than a predetermined position, and D1>D0'>D2 more on a lower side than the position.

Furthermore, if the upper end portion 104U is the highest as well as a rearmost portion (most occupant side portion) of the cushion 104, the cushion 104 may be overall configured such that D1>D0>D2. By applying this setting, a developed shape of the cushion 104 is relatively smooth and an increase in capacity of the cushion 104 can be suppressed. According to the cushion 104 having these configurations, deployment can be started at an early stage in a direction of the abdomen 142 of the occupant 138 and initial restraining can be started on the occupant 138 from the abdomen 142.

As described above, the cushion 104 of the present example is configured to have a wide area of the occupant side panel 120 serving as an occupant restraining surface and a narrow area of the steering side panel 122, which obtains a reaction force from the variant steering wheel 106. The variant steering wheel 106 has a narrower contact range with the airbag cushion than a conventional circular steering wheel. The steering side panel 122 can be set to a dimension based on the variant steering wheel 106 so as to omit a portion that does not contact the variant steering wheel 106. This allows the amount of material used to construct the steering side panel 122 to be reduced and the gas capacity of the cushion 104 to be reduced, thereby contributing to cost reduction.

The cushion 104 of the present embodiment can be set to have a gas capacity within a range of 50 liters to 60 liters by using the steering side panel 122 with a small diameter. This reduces the number of panels configuring the cushion 104. Therefore, the cushion 104 can be folded or the like into a smaller storing form, and thus can be easily installed on the variant steering wheel 106 with limited storing space.

A gas capacity within the aforementioned range eliminates the need for a high output inflator and an inflator 112 (see FIG. 2(a)), which is as small and inexpensive as possible, can be used. For example, the inflator 112 can use an output in a range of 200 kPa to 230 kPa. An inflator with this output is small and inexpensive, which is beneficial from the perspective of weight reduction and cost reduction. Reducing the gas capacity of the cushion 104 shortens the time required for the expansion of the cushion 104 to be completed, which leads to the improvement of the occupant restraining performance.

In the present embodiment, an upper end 120a of the occupant side panel 120 of the expanded and deployed cushion 104 is set to be positioned at a height within a range of ±100 mm of the center of gravity of the head of an adult male. For example, the occupant 138 in FIG. 4 is assumed to be a test dummy AM50 that mimics a physique that conforms to 50% of the average U.S. adult male (50th percentile male equivalent, 175 cm tall and 78 kg in weight). The upper end 120a of the occupant side panel 120 of the cushion 104 is set to be positioned at a height within a range of ±100 mm of the center of gravity P3 of the head of the AM50.

The head 140 of the occupant 138 may cause a rotational movement such as forward bending, backward bending, or the like when contacting the occupant side panel 120 from the chin, forehead, or the like. As described above, the forward and backward bending of the head 140 are likely to cause high injury values due to the structure of the human body. The cushion 104 of the present embodiment contacts the occupant side panel 120 from the position of the center of gravity P3 of the head to restrain the head 140 without excess movement, thereby enabling the injury value to be reduced.

Figure 5:
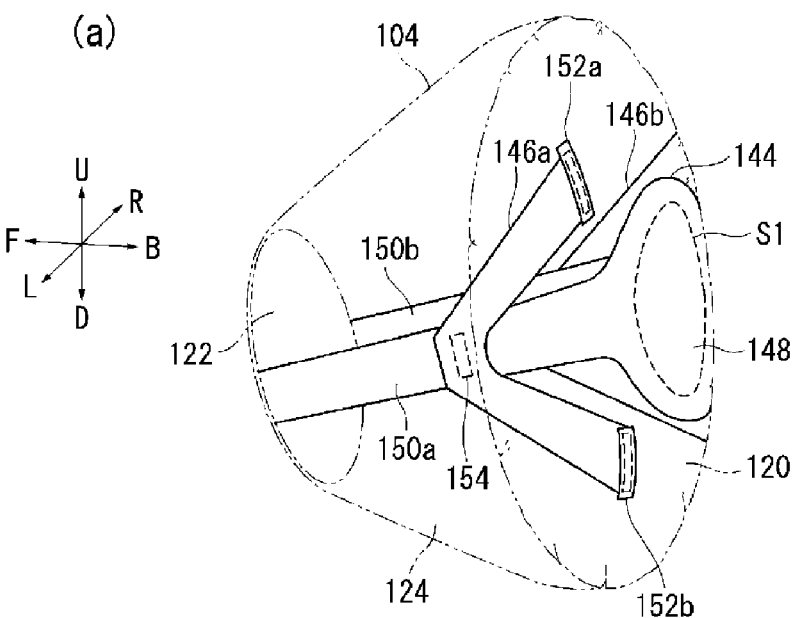
FIG. 5 is a diagram illustrating an internal structure of the cushion in FIG. 2(a).
Figure 5:
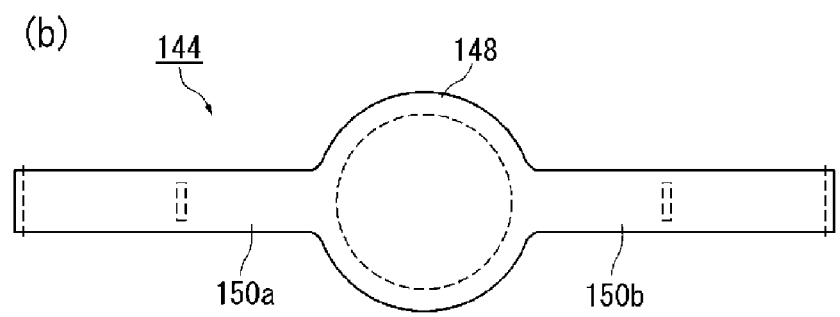
Figure 5:
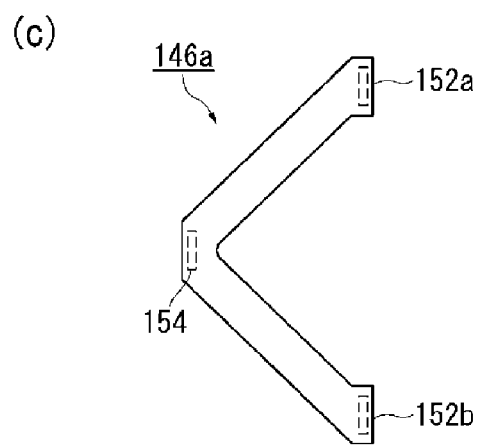

FIG. 5 is a diagram illustrating an internal structure of the cushion 104 in FIG. 2(a). FIG. 5(a) illustrates an internal structure of the cushion 104 of FIG. 2(a) as seen through the panels.

As illustrated in FIG. 5(a), the cushion 104 has an internal tether 144 that is provided between the occupant side panel 120 and the steering side panel 122. The internal tether 144 is a member that controls the shape of the occupant side panel 120 during expansion and deployment of the cushion 104. Furthermore, two auxiliary tethers 146a, 146b are also provided inside the cushion 104 to assist with a function of the internal tether 144.

FIG. 5(b) is a diagram of the internal tether 144 of FIG. 5(a) spread out on a plane. The internal tether 144 has a circular center panel 148 of a predetermined area and tethers 150a, 150b extending from two left and right edges of the center panel 148. The center panel 148 is connected to an inner side of the occupant side panel 120 by circular stitching S1. Tethers 150a, 150b are symmetrically provided on two left and right edges of the center panel 148 and extend toward the steering side panel 122.

The lengths of the tethers 150a, 150b are set to dimensions that are tensioned when the cushion 104 is expanded and deployed, pulling the occupant side panel 120 toward the steering side panel 122 via the center panel 148. With the tethers 150a, 150b, the shape of the occupant side panel 120 can be changed to increase the occupant restraining force or reduce the injury value. In particular, the tethers 150a, 150b extend from symmetrical points of the center panel 148, and therefore, the shape of the occupant side panel 120 can be efficiently controlled via the center panel 148.

FIG. 5(c) is a diagram of the auxiliary tether 146a of FIG. 5(a) spread out in a planar manner. The auxiliary tethers 146a, 146 have the same configuration, and therefore, only auxiliary tether 146a is used as an example. The auxiliary tether 146a is shaped with two sides intersecting at one point and is connected to the occupant side panel 120 at two end portions 152a, 152b and to the tether 150a at a bent portion 154. When the tethers 150a, 150b are tensioned during expansion and deployment of the cushion 104, the auxiliary tethers 146a, 146b are also pulled toward the steering side panel 122 side through the tethers 150a, 150b. The auxiliary tethers 146a and 146b enable the shape of the occupant side panel 120 to be efficiently controlled and expanded to a target shape.

Note that the center panel 148 may be connected to a biased position on a lower side of the occupant side panel 120. By reducing the expansion of the lower portion 104b of the occupant side panel 120 through the center panel 148, the lower portion 104b of the occupant side panel 120 can easily enter between the variant steering wheel 106 and the abdomen 142 of the occupant 138, as described with reference to FIG. 4. Furthermore, although the tethers 150a, 150b are configured to extend from the left and right sides of the center panel 148 in the present embodiment, the tethers can also be configured to extend from upper and lower sides, and the number of tethers can be increased. When a plurality of the tethers are provided, the tethers are preferably provided at locations where gas from the inflator 112 (see FIG. 2(a)) does not make direct contact.

Modified Example

Modified examples of each component of the airbag 100 for a driver seat described above will be described below. In each of the modified examples illustrated in FIGS. 6 to 11 below, the same components as those already described are omitted from the description by labeling with the same symbol. Furthermore, the same names as the components described above shall have the same functions unless otherwise indicated even when labeled with a different symbol.

Figure 6:
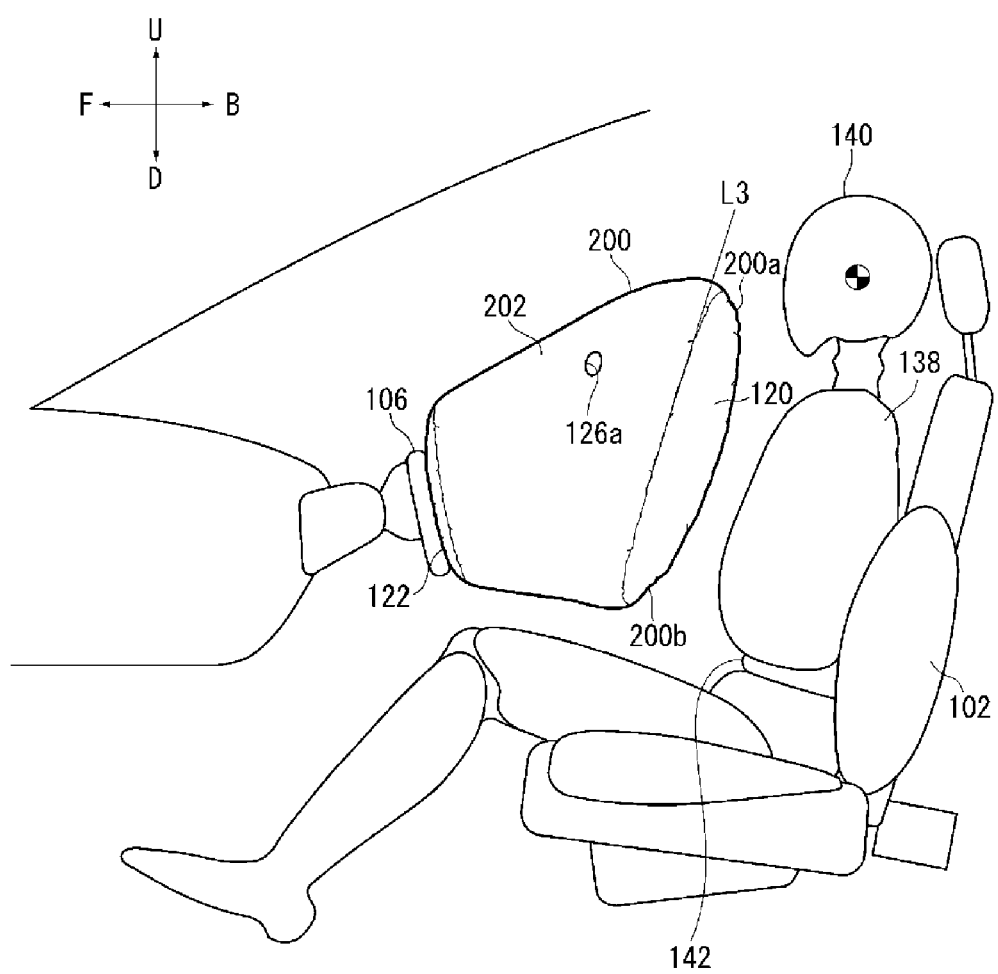
FIG. 6 is a diagram illustrating a modified example of the cushion in FIG. 4.

FIG. 6 is a diagram illustrating a modified example (cushion 200) of the cushion 104 in FIG. 4. When the cushion 200 is viewed from the vehicle width direction in the expanded and deployed state, a boundary L3 between a side panel 202 and the occupant side panel 120 extends inclined toward the rear of the vehicle, in other words, towards the occupant 138, while moving upward. According to this configuration, an upper portion 200a of the cushion 200 comes into contact with the occupant 138 prior to another portion of the cushion 200, thereby enabling early restraint of the head 140 to be achieved. Furthermore, the thickness of a lower portion 200b of the cushion 200 in the vehicle front-rear direction is suppressed inversely proportional to the protrusion of the upper portion 200a toward the occupant 138 side, and therefore, the lower portion 200b easily enters between the abdomen 142 of the occupant 138.

Figure 7:
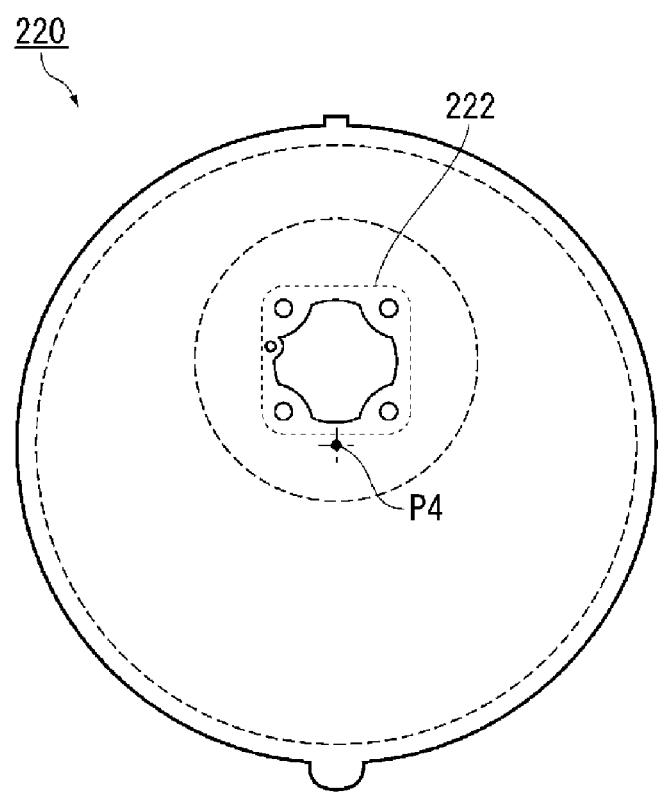
FIG. 7 is a diagram illustrating a modified example of a steering side panel in FIG. 3(b).

FIG. 7 is a diagram illustrating a modified example (steering side panel 220) of the steering side panel 122 in FIG. 3(b). In the steering side panel 220, a secured region 222 is provided more on an upper side than a center P4 of the steering side panel 220, as compared to the steering side panel 122 of FIG. 3(b).

The steering side panel 220 is positioned closer to a lower side with regard to the variant steering wheel 106 (see FIG.

4 and the like) when mounted on the variant steering wheel 106 (see FIG. 4, etc.) due to the secured region 222 being on the upper side. Furthermore, the entire cushion 200 is also disposed slightly lower along with the steering side panel 220. This allows the cushion 200 to be easily positioned in front of the abdomen 142 of the occupant 138 and the cushion 200 to be easily sandwiched by the variant steering wheel 106 and the abdomen 142 without changing the shape of the cushion 200.

Figure 8:
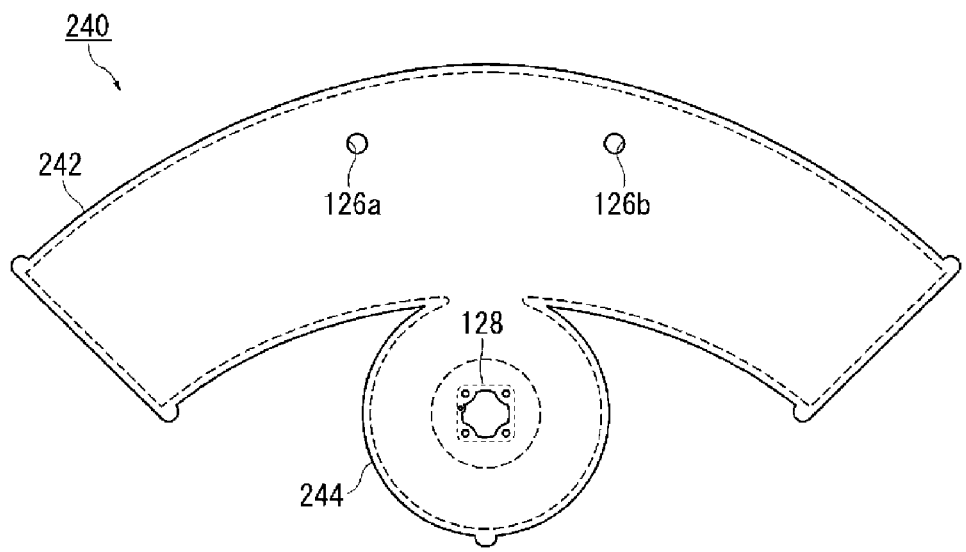
FIG. 8 is a diagram illustrating a modified example of each of the panels in FIG. 3.
Figure 8:
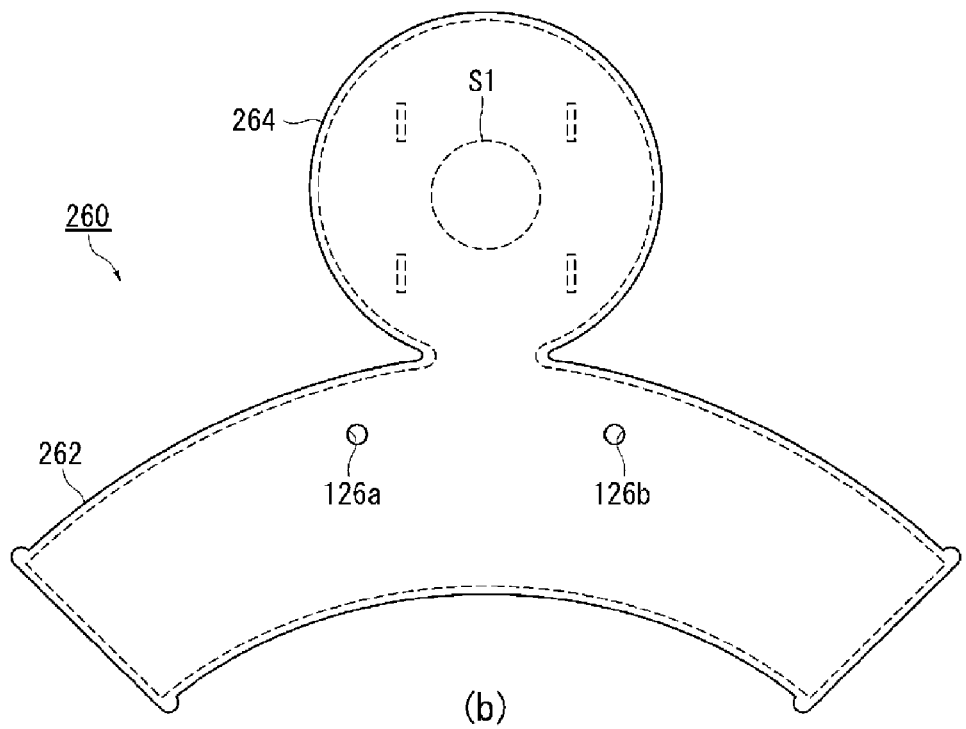

FIG. 8 is a diagram illustrating a modified example of each of the panels in FIG. 3. FIG. 8(a) illustrates a configuration in which the side panel 124 of FIG. 3(c) and the steering side panel 122 of FIG. 3(b) are integrated (first integrated panel 240). In the integrated panel 240, a small diameter side arc of a side panel 242 and a portion of an edge of a steering side panel 244 are continuous, and the aforementioned side panel 124 and the steering side panel 122 are realized in a single panel. The truncated cone shaped cushion 104 described above can also be suitably realized by combining this integrated panel with the occupant side panel of FIG. 3(a).

FIG. 8(b) illustrates a configuration in which the side panel 124 of FIG. 3(c) and the occupant side panel 120 of FIG. 3(a) are integrated (second integrated panel 260). In the integrated panel 260, a large diameter side arc of a side panel 262 and a portion of an edge of an occupant side panel 264 are continuous, and the aforementioned side panel 124 and the occupant side panel 120 are realized in a single panel. The truncated cone shaped cushion 104 described above can also be suitably realized by combining this integrated panel 260 with the steering side panel 122 of FIG. 3(b).

Figure 9:
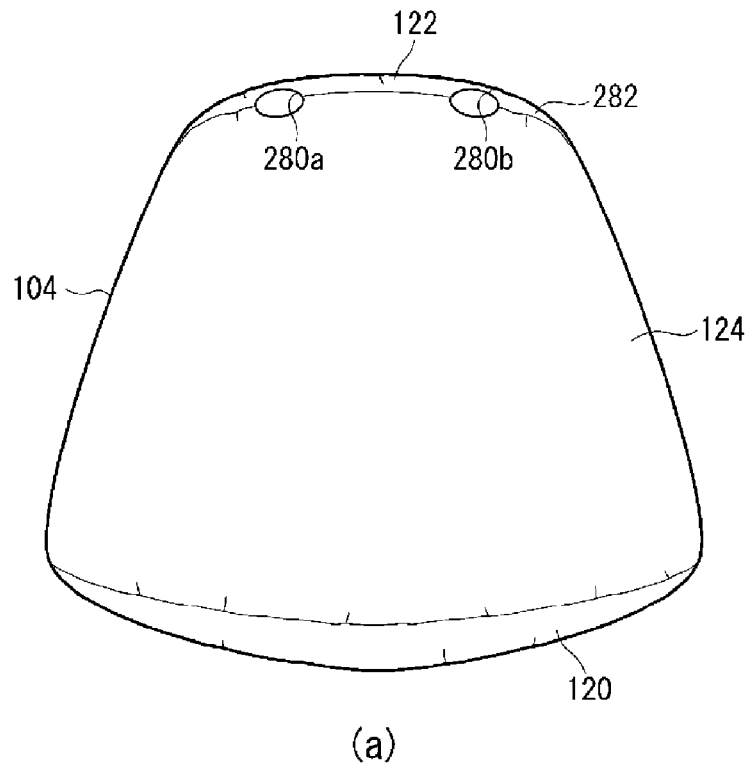
FIG. 9 is a diagram illustrating a modified example of a vent hole in FIG. 2(c).
Figure 9:
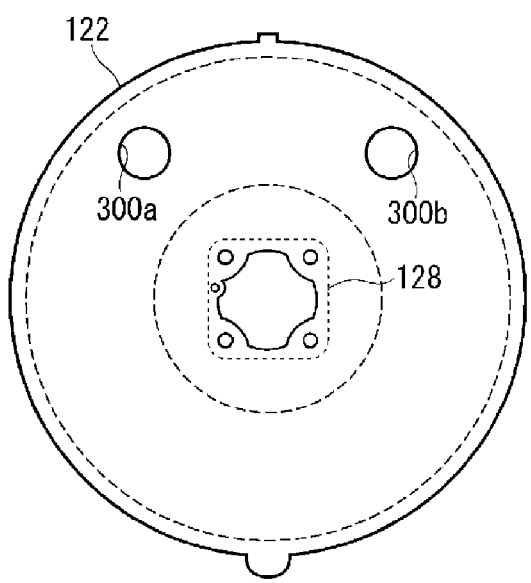

FIG. 9 is a diagram illustrating a modified example of the vent holes 126a, 126b in FIG. 2(c). FIG. 9(a) illustrates a first modified example of the vent holes 126a, 126b of FIG. 2(c) (second vent holes 280a, 280b). Vent holes 280a, 280b are formed by opening a portion of a boundary 282 between the side panel 124 and the steering side panel 122. The boundary between the side panel 124 and the steering side panel 122 is positioned at the vehicle front side, and the body of the occupant 138 (see FIG. 4) is not positioned in a periphery, particularly on an upper side. Therefore, a portion on an upper side of the boundary 282 between the side panel 124 and the steering side panel 122 is opened to form the vent holes 280a, 280b, and thus gas can be discharged in a direction where the occupant 138 is not present.

FIG. 9(b) illustrates a second modified example of the vent holes 126a, 126b of FIG. 2(c) (third vent holes 300a, 300b). Vent holes 300a, 300b are provided in the steering side panel 122. The vent holes 300a, 300b are opened in the steering side panel 122 at locations that do not contact the variant steering wheel 106 (see FIG. 4 and the like), such that gas can be discharged in a direction where the occupant 138 is not present.

The first vent holes 126a, 126b, second vent holes 280a, 280b and third vent holes 280a, 280b can be implemented simultaneously for one airbag cushion. The airbag cushion can implement each of these vent holes as appropriate, depending on a positional relationship with an occupant and an arrangement of a peripheral structure.

Figure 10:
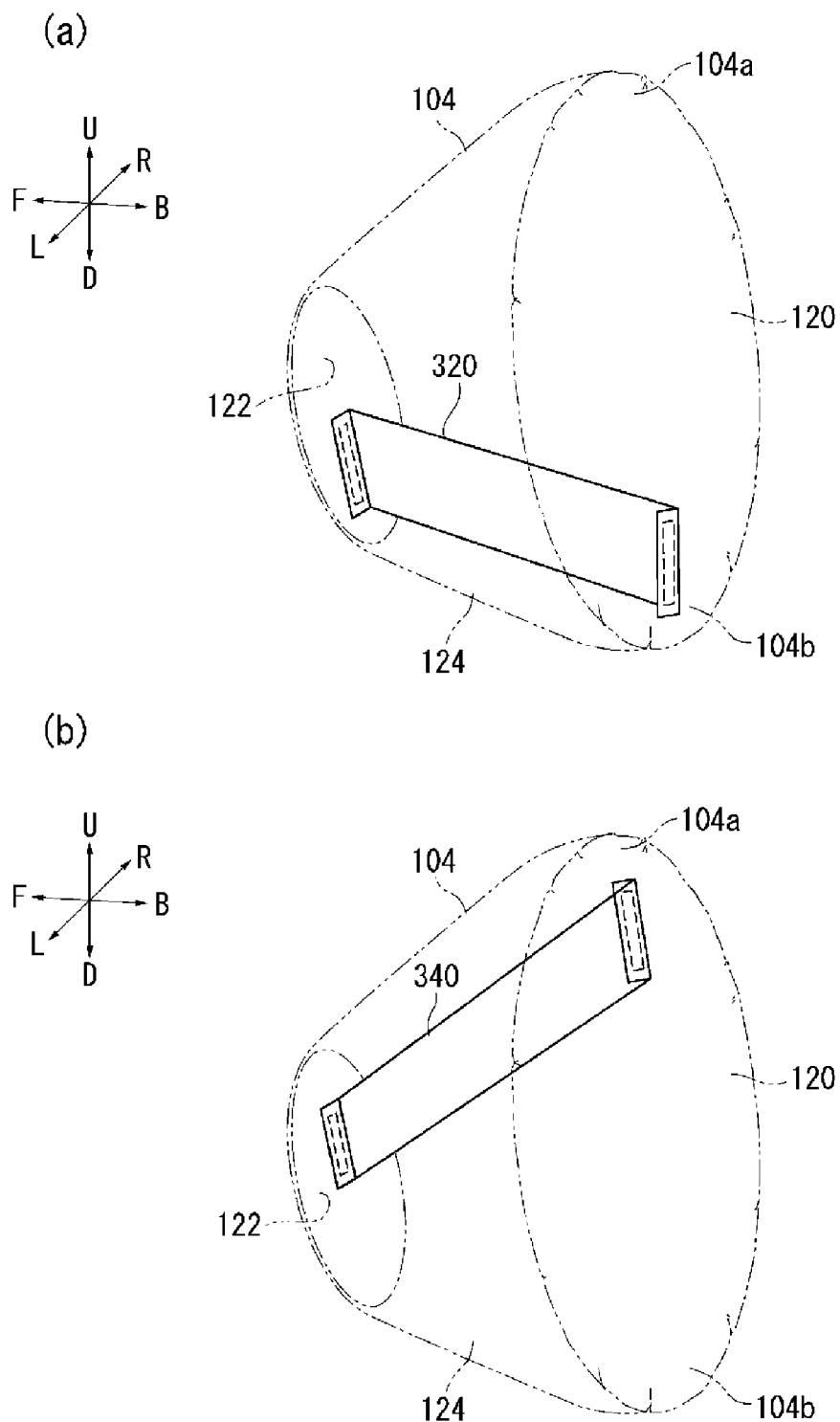
FIG. 10 is a diagram illustrating a modified example of a tether in FIG. 5(a).

FIG. 10 is a diagram illustrating a modified example of the tethers 150a, 150b in FIG. 5(a). FIG. 10(a) is a diagram illustrating a first modified example (tether 320) of the tethers 150a, 150b in FIG. 5(a). Only one tether 320 is provided inside the cushion 104 and is connected to a lower side of the center of the occupant side panel 120 and to a lower side of the steering side panel 122. The dimensions of the tethers 320 are also set to a length that will tension and pull the occupant side panel 120 toward the steering side panel 122 when the cushion 104 is expanded and deployed. Providing the tether 320 reduces expansion of the lower portion 104b of the occupant side panel 120, and thus the cushion 104 can easily enter in front of the abdomen 142 of the occupant 138 (see FIG. 4).

FIG. 10(b) is a diagram illustrating a second modified example (tether 340) of the tethers 150a, 150b in FIG. 5(a). Only one tether 340 is also provided inside the cushion 104 and is connected to an upper side of the center of the occupant side panel 120 and to an upper side of the steering side panel 122. The dimensions of the tethers 340 are also set to a length that will tension and pull the occupant side panel 120 toward the steering side panel 122 when the cushion 104 is expanded and deployed.

The tether 340 can reduce expansion of the upper portion of the occupant side panel 120. For example, a depression can be formed in the occupant side panel 120, and this depression can reduce the load on the head 140 of the occupant 138 (see FIG. 4). In particular, if the occupant 138 is in a non-normal seating position (commonly known as out-of-position), the load of the occupant 138 upon contact with the occupant side panel 120 may be significant. In this case, the injury value to the head 140 can be reduced by suppressing the expansion of a location on the occupant side panel 120 that is likely to be contacted by the head 140, using the tether 340.

Note that the tether 320 of the first modified example and the tether 340 of the second modified example described above can be implemented simultaneously for a single airbag cushion. This configuration allows the airbag cushion to reduce the load on the head by forming a depression on an upper portion while allowing a lower portion to enter in front of the abdomen of an occupant.

Figure 11:
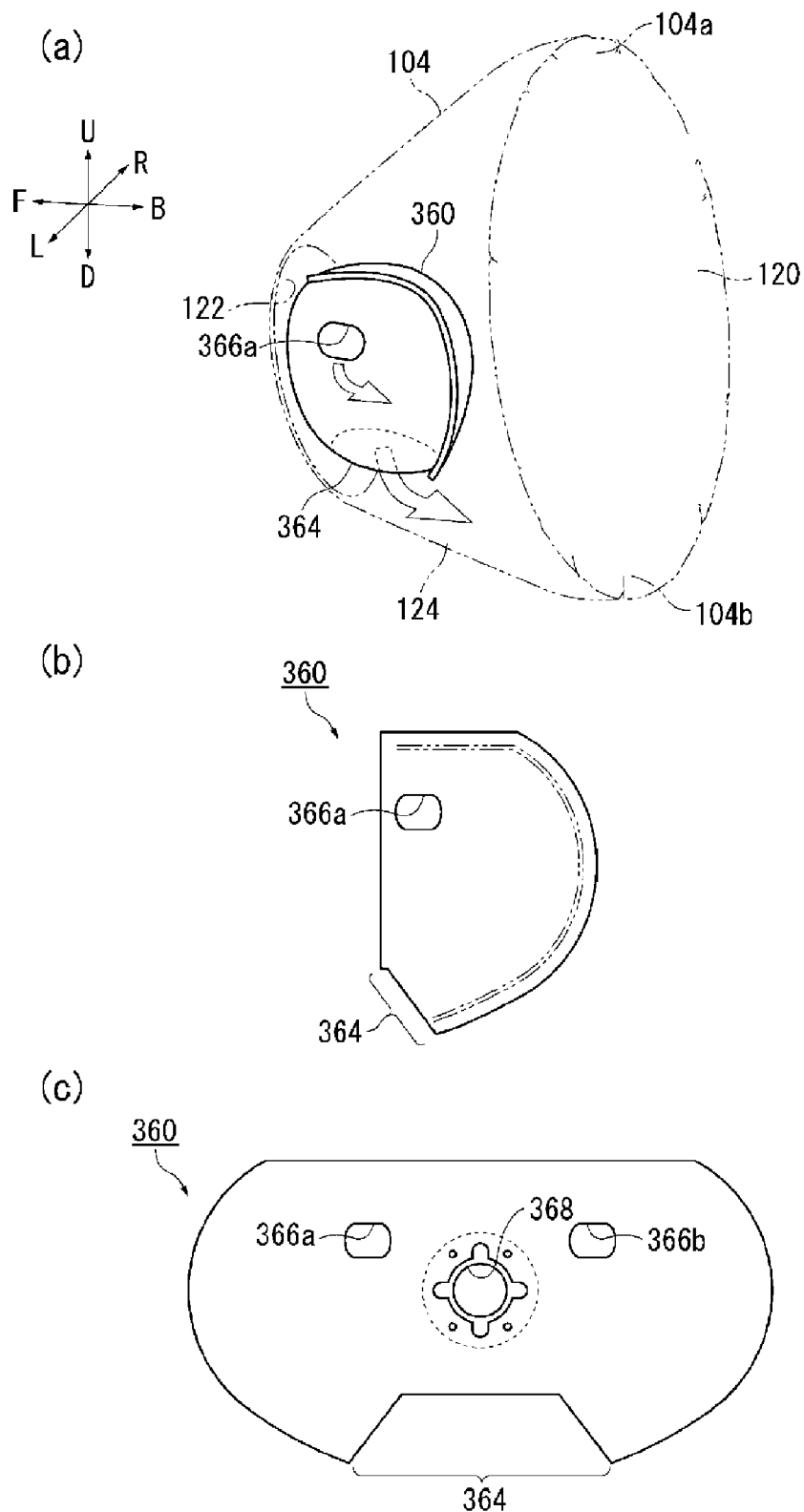
FIG. 11 is a diagram illustrating a modified example of an internal structure of the cushion in FIG. 2(a).

FIG. 11 is a diagram illustrating a modified example of an internal structure of the cushion 104 in FIG. 2(a). FIG. 11(a) illustrates an internal structure through each panel of the cushion 104 of FIG. 2(a). The cushion 104 is provided with a flow-regulating material 360 as a new internal structure.

The flow-regulating material 360 is a member that directs the gas of the inflator 112 (see FIG. 2(a)) in a specified direction and is connected to the steering side panel 122 inside the cushion 104, in a state covering a portion having the gas discharging port 116 of the inserted inflator 112. The flow-regulating material 360 has an opening portion 364 below the inflator 112 that discharges gas, and small diameter exhaust ports 366a, 366b (see FIG. 11(c)) on side portions that also discharge gas.

FIG. 11(b) is a diagram illustrating the flow-regulating material 360 in FIG. 11(a) from a side. The flow-regulating material 360 is formed in a bag shape by stitching, and a lower side edge is open to form an opening portion 364.

FIG. 11(c) illustrates a state where the flow-regulating material 360 of FIG. 11(b) unstitched and spread out on a plane. The flow-regulating material 360 is provided with an inserting port 368 into which a portion of the inflator 112 (see FIG. 2(a)) is inserted, and is secured to the interior of the hub 108 (see FIG. 1(a)) along with the steering side panel 122 by the stud bolts 118 of the inflator 112. Exhaust ports 366a, 366b are provided at two locations on left and right sides to supply gas in the vicinity of the center of the cushion 104. The opening portion 364 is formed to a larger diameter than the exhaust ports 366a, 266b and allows more gas to pass through than the exhaust ports 366a, 266b.

With the flow-regulating material 360 described above, the gas supplied from the inflator 112 is preferentially supplied to the lower portion 104b of the cushion 104 (FIG.

11(a)) through the opening portion 364. This causes the cushion 104 to start deploying at an early stage from the lower portion 104b side toward the abdomen of the occupant. According to this configuration, the cushion 104 allows the lower portion 104b to enter between the variant steering wheel 106 (see FIG. 4) and the abdomen 142 of the occupant 138 at an early stage, and the lower portion 104b is sandwiched between the variant steering wheel 106 and the abdomen 142 to stabilize the overall shape while starting initial restraining of the occupant 138 from the abdomen 138.

The flow-regulating material 360 can be implemented simultaneously with each tether such as the internal tether 144 and the like described above. At this time, each tether is preferably provided at a position that does not inhibit the flow of gas from the opening portion 364 of the flow-regulating material 360.

Preferred examples of the present invention were described above while referring to the attached drawings. However, the embodiments described above are preferred examples of the present invention, and other embodiments can be implemented or performed by various methods. In particular, unless described otherwise in the specification of the present application, the invention is not limited to the shape, size, configurational disposition, and the like of parts illustrated in detail in the attached drawings. Furthermore, expressions and terms used in the specification of the present application are used for providing a description, and the invention is not limited thereto, unless specifically described otherwise.

Therefore, it is obvious that a person with ordinary skill in the art can conceive various changed examples or modified examples within the scope described in the scope of the claims, which is understood to naturally belong to the technical scope of the present invention.

INDUSTRIAL APPLICABILITY

The present invention can be used as an airbag for a driver seat for restraining an occupant during an emergency.

The invention claimed is:
1. An airbag for a driver seat, comprising:
a steering wheel of a vehicle;
an inflator stored in the steering wheel; and,
an airbag cushion stored in the steering wheel along with the inflator that expands and deploys to restrain an occupant; wherein
the airbag cushion contains a steering side panel positioned on a steering wheel side, an occupant side panel located on an occupant side, and, a side panel connecting an edge of the steering side panel to an edge of the occupant side panel to configure a side portion of the airbag cushion,
the occupant side panel having a larger area than the steering side panel, and an upper portion of the expanded and deployed airbag cushion being configured such that a width of the upper portion of the expanded and deployed airbag cushion in a front/rear direction of the vehicle is greater than a width of the lower portion of the expanded and deployed airbag cushion, wherein the airbag cushion is configured to deploy in the shape of a truncated cone such that the airbag cushion tapers along the front/rear direction of the vehicle between the occupant side panel and the steering side panel to increase in height towards the occupant side panel; and wherein the expanded and deployed airbag cushion has a center of the occupant side panel positioned above a center of the steering side panel.

2. The airbag for a driver seat according to claim 1, wherein the steering wheel contains:
a central hub that stores the inflator and airbag cushion, and,
a grip that rotates about the hub, wherein the grip is a variant other than a circular ring.

3. The airbag for a driver seat according to claim 1, wherein the side panel has an arcuate strip shape in a state spread out on a plane,
a center in a longitudinal direction of the arcuate strip shaped side panel is positioned on the upper portion of the expanded and deployed airbag cushion, two ends in the longitudinal direction are positioned at the lower portion of the airbag cushion, and,
the center in the longitudinal direction of the arcuate strip shaped side panel is wider than the two ends in the longitudinal direction.

4. The airbag for a driver seat according to claim 3, wherein the two ends in the longitudinal direction of the arcuate strip shaped side panel are connected to each other at the lower portion of the expanded and deployed airbag cushion, and,
the width of the center in the longitudinal direction of the arcuate strip shaped side panel is 1.1 to 2.7 times greater than the width of the two ends in the longitudinal direction.

5. The airbag for a driver seat according to claim 1, wherein the side panel is provided between the entire circumference of the edge of the steering side panel and the entire circumference of the edge of the occupant side panel.

6. The airbag for a driver seat according to claim 1, wherein the side panel is continuous on at least a portion of the edge of the steering side panel or on at least a portion of the edge of the occupant side panel.

7. The airbag for a driver seat according to claim 1, wherein a boundary between the side panel and the occupant side panel extends upward, or extends at an angle in the backward and upward direction, when the expanded and deployed airbag cushion is viewed from a vehicle width direction.

8. The airbag for a driver seat according to claim 1, wherein the steering side panel is circular,
the circular steering side panel has a secured region secured to the steering wheel, and,
the secured region is provided in a center of the circular steering side panel or on an upper side of the center of the circular steering side panel.

9. The airbag for a driver seat according to claim 1, wherein an upper end of the occupant side panel of the expanded and deployed airbag cushion is positioned at a height in a range of ±100 mm of the center of gravity of the head of a test dummy AM50.

10. The airbag for a driver seat according to claim 1, wherein the airbag cushion has a first vent hole that is opened in the side panel and discharges gas.

11. The airbag for a driver seat according to claim 1, wherein the airbag cushion has a second vent hole in a condition where a portion of a boundary between the side panel and the steering side panel is opened and discharges gas.

12. The airbag for a driver seat according to claim 1, wherein the airbag cushion has a third vent hole that is opened in the steering side panel and discharges gas.

13. The airbag for a driver seat according to claim 1, wherein the airbag cushion further contains one or more tethers that pass into the occupant side panel and the steering side panel, and, at least one of the one or more tethers has a dimension that tensions when the airbag cushion expands and deploys to pull the occupant side panel toward the steering side panel, wherein the one or more tethers are configured to control deployment of the airbag cushion such that the width of the upper portion of the expanded and deployed airbag cushion in the front/rear direction of the vehicle is greater than the width of the lower portion of the expanded and deployed airbag cushion.

14. The airbag for a driver seat according to claim 13, wherein the airbag cushion further has a center panel of a predetermined area connected by circular stitching to an inner side of the occupant side panel, a plurality of the tethers are provided, and, the plurality of tethers extend from a plurality of locations on the center panel towards the steering side panel.

15. The airbag for a driver seat according to claim 14, wherein the plurality of tethers extend from symmetrical points on the center panel.

16. The airbag for a driver seat according to claim 14, wherein the center panel is connected to a biased position on a lower side of the occupant side panel.

17. The driver airbag according to claim 13, wherein the tether is connected to a lower side of a center of the occupant side panel.

18. The driver airbag according to claim 13, wherein the tether is connected to an upper side of a center of the occupant side panel.

19. The airbag for a driver seat according to claim 1, wherein a portion of the inflator is inserted into the airbag cushion through the steering side panel, and a predetermined gas discharging port is formed in the portion, the airbag cushion further has a flow-regulating material connected to the steering side panel and covering a portion of the inflator, and, the flow-regulating material contains an opening part below a portion of the inflator.

20. The airbag for a driver seat according to claim 1, wherein the occupant side panel is circular.

21. The airbag for a driver seat according to claim 1, wherein the airbag cushion tapers along the front/rear direction of the vehicle between the occupant side panel and the steering side panel along both the upper portion and the lower portion of the airbag cushion.

22. The airbag for a driver seat according to claim 1, wherein the steering side panel is, upon deployment, disposed in an inclined manner such that an upper part of the steering side panel leans to a front side of the vehicle.

* * * * *